UNITED STATES PATENT OFFICE 2,675,736

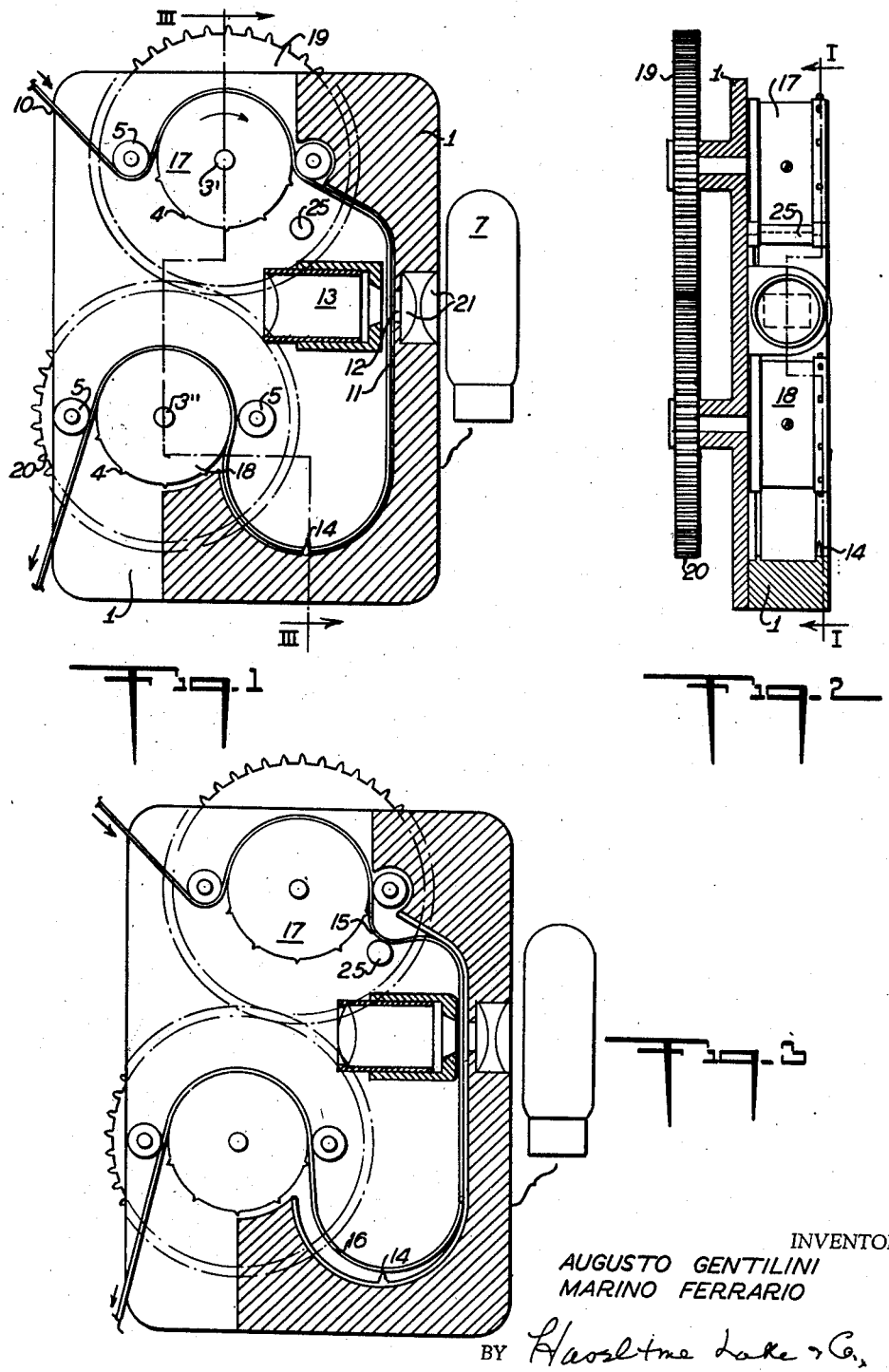

INTERMITTENT FILM ADVANCING DEVICE UTILIZING FIXED TOOTH

Augusto Gentilini, Lecco, and Marino Ferrario, Monza, Italy, assignors to Sicom Societa a Responsabilita Limitata, Milan, Italy Application February 24, 1950, Serial No. 146,112

Claims priority, application Italy January 17, 1950

2 Claims. (Cl. 88—18)

The present invention relates to cinematographic apparatus, and more particularly to a film feed device for causing intermittent forward movement of the film past an aperture at which the film pauses for a brief moment to enable the projection therethrough of a beam of light.

In the co-pending application of Gentilini, Serial No. 64,478, there is described a device for intermittently moving a cinematograph film past the objective for exposure or projection, where the film is fed or withdrawn with uniform motion with respect to a surface provided with an aperture for the passage of light and with a small tooth engaging with the perforations of the film; the film retained at the aperture by the small tooth undergoes elastic deformation by effect of the double drive for continuous feed, so as to be released from the small tooth at a certain instant, whereby intermittent feed of the film may be effected thus engaging with said small tooth one of the subsequent perforations.

As described in the co-pending application, said intermittent feed of the film may be enhanced by a fixed member encountered by the film during its elastic deformation, or it may be obtained only by the elastic reaction of the film having undergone deformation, because after being released from the small tooth it finds very quickly its new position of rest, presenting the subsequent image before the aperture for passage of light and engaging another subsequent perforation with the said small tooth.

It has been found that this latter form of embodiment offers great advantage in practice because it enables to reduce the number of moving parts controlling the feed of the film to a very small number and, as a limit, to a single member only, consisting of a toothed roller or sprocket, two opposed segments of which respectively engage with the arriving and departing side of the film, providing their uniform feed and withdrawal with obviously identical speed.

It should be noted that, as will be seen also from the drawings of the co-pending application, the small tooth for stopping the film must be placed beyond the aperture for passage of light in the path of the film; as the film is disengaged from the small tooth by action of the continuous traction dragging it to the exit of the device, the aperture must be positioned in that section of elastic inactivity of the film, where said film at least for a notable fraction of each cycle of intermittent feed, is not removed from the surface containing the aperture by action of the member that causes continuous withdrawal toward the exit of the device; if the film were so removed, it would move continuously with respect to the focal plane of the objective, thus rendering the shot or projection noticeably defective.

With the form of embodiment illustrated in the co-pending application, the small tooth is positioned in proximity to the aperture for passage of light, and this arrangement contributes to ensuring perfect stability in a direction transversal to the direction of the light beam of the image being projected or taken, but it involves a certain displacement of the film in the direction of said light beam, that is to say, with respect to the focal plane of the objective if the film disengages from the small tooth; this causes the image to get slightly out of focus, which however, being of short duration, is disguised by the shutter, which generally is provided in cinematograph machinery.

It has been found, according to the present invention, that if the said small tooth is arranged at a certain distance from the aperture for passage of light, always beyond this aperture in the path of movement of the film, it is possible to cause the film to bend elastically in the section involved with disengaging the tooth, without any bending in the section that finds itself in front of the aperture for passage of light; this section remains flat and is displaced intermittently while always remaining in the same plane, so that any possible loss of focus is prevented.

The intermittent movement of the film past the aperture is so quick as not to be perceivable in practice by the eye and, since it is not preceded by any other movement of the image tending to bring it out of focus, it has been found that, if desired, the shutter may consequently be completely eliminated, particularly with projection apparatuses.

This means very important advantages: in the first place, the luminous efficiency of the apparatus is increased by the notable percentage that it normally screened off by the shutter; in the second place, the construction of the apparatus is further simplified, as well as its operation; in the third place, the observer's eye is no longer excited by a rapid intermittence of light and dark, which, whilst it cannot be noted by the observer of the cinematograph scene, however produces obnoxious effects on the sight organs, especially if cinematograph vision lasts a long time.

In the accompanying drawings:

Figures 1 and 2 represent in section a form of embodiment of the invention in two different positions of the film, the section being along line I—I of Figure 3; and Figure 3 is a section of Figure 1 along line III—III without the film.

The device represented in Figures 1 to 3 is constituted by a body 1 provided with a cavity or chamber having a contour of mixed lines and a depth equal about to the width of the cinematograph film to be used; in this cavity there are arranged two rollers 17 and 18 rotatable about the pins 3' and 3'' and provided with peripheral teeth 4 of a size to engage with the perforations of the film, four transmission rolls 5, preventing the two sides of film from mutual sliding, and a means for illumination of the film, which will be described hereinafter. The film, designated with 10 in the drawing, passes round a sector of the roller 17, bearing (Figure 1) against two of the rolls 5, then bears on the whole contour of the cavity of the body 1 along two ribs 11, which support the lateral borders of the film, and eventually winds up a sector of the roller 18, bearing against the other two rolls 5 and coming out in the direction of the arrow.

In front of the aperture 12 of the chamber 1, there is provided a lamp 7. The film passes between the aperture 12 and an objective 13 in a rectilinear direction. One of the ribs 11 is provided with a small tooth 14 in a position comprised between the aperture 12 and the point at which the film winds up on the second roller 18, at a certain distance from the aperture 12, where the profile of the aforesaid cavity is curvilinear.

Preferably, the distance of the small tooth 14 from the aperture 12 is two to ten times the pitch of the film. The small tooth 14 is pointed and its flanks are somewhat curved toward the aperture 12, that is to say in a sense contrary to the direction of feed of the film on the ribs 11.

Operation of the device appears clearly from further inspection of Figures 1 and 2, bearing in mind that the direction of movement of the film and of the rollers 17 and 18 is indicated by the arrows.

Starting from the position of Figure 1, a rotation of the rollers 17 and 18 tends to make the film slide, the film bearing on the ribs 11, and to make it advance as indicated by the arrows. Inside the body 1, however, this motion of the film is prevented by the small tooth 14, whence the film, by effect of rotation of the roller 17, partly detaches from the ribs 11 and exactly in the position indicated at 15 in Figure 2, the excess of its length forms a loop by elastic deformation, while on the rectilinear section before the opening 12, it remains adherent to the ribs 11 and, in the last section indicated with 16 in Figure 2, it detaches also from the ribs 11 by effect of the traction caused by the roller 18; as a consequence of the displacement of this last film section, the film tends also to disengage from the small tooth 14, which has so far prevented it from sliding on the ribs 11 and, while the motion of the roller 17 goes on, the film eventually assumes a position where the loop produced in position 15 is still increased while the traction exerted on the film has increased the distance of the film at 16 from the ribs 11 and has brought the perforation of the film to completely disengage from the small tooth 14.

The film liberated from the engagement with the small tooth 14, cannot remain in this position of deformation with respect to its line of elastic equilibrium, but while the loop formed at 15 stretches out, the film returns to the position of Figure 1, first sliding over the small tooth 14, which then penetrates into the subsequent perforation.

The passage of the film back to the position of Figure 1 takes place with a rapidity that may be compared with the speed of release or snap action of a spring, because no obstacle retains its movement and the friction against the ribs 11 and the top of the small tooth 14 involves an absolutely negligible braking action especially if the profile of the ribs 11 is of convenient design, such as for example in the case of Figures 1 to 3.

This elastic release motion of the film brings before the aperture 12 the image subsequent to the one that was there previously, and this passage, proved in practice, takes place with a rapidity much greater than obtainable with conventional intermittent feed devices as used heretofore with cinetograph apparatuses for exposure and projection, whence the case of projecting apparatuses, the shutter may be dispensed with, since the eye does not perceive the very rapid shifting of the film.

The slight curvature of the flanks of the small tooth 14 facilitates the engagement of the arriving perforation with said tooth. It is advisable, in general, that the profile of the small tooth follows the natural elastic motion of the film in register with the perforation engaging with said tooth.

The rollers 17, 18 move as units together with the gears 19, 20 which engage with each other in such a manner that the two rollers 17, 18 rotate with equal speed and in opposite directions; the film 10 winds up first on one sector of the roller 17, then slides on the two ribs 11 and then winds up on a sector of the roller 18, which drags it out of the device. In the proximity of the roller 17 there is provided a member 25, for example shaped as a stake, against which the loop 15 bears to increase the snap action when the deformation of the film reaches a certain limit; beyond this limit, the further movement of the roller 17 causes in the film an increase of elastic constriction and consequently an increase of stress in the longitudinal sense, which stress becomes a stronger push forward as soon as the movement of the roller 18 comes to disengage the film from the small tooth 14. The introduction of the piece 25 therefore contributes to create a stronger initial action to overcome the inertia of the film at the time of its disengagement from the small tooth and consequently, a more rapid release movement forward.

The arrangement of Figures 1 to 3 is evidently more complicated than the arrangement previously described in the co-pending application, because it involves two rollers in lieu of one only, but it permits to obtain a free space between the two rollers 17, 18 through which the light beam can pass without a need of reflecting it by 90 degrees as in the preceding case.

In the present case, the lamp 7 is in front of the aperture 12 on the opposed side of the film; in said aperture there is arranged an optical condenser system 21, whilst the objective 12 is inside the body 1; the light beam projected by the objective 13 passes freely through the two rollers 17, 18.

In Figure 3 there is indicated only one small tooth 14, but it is evident that there may be two small teeth, one on each of the ribs 11, and this is understood for those cases in which the film is provided with double perforation.

Figure 1 represents the device immediately after the forward release of the film, whilst Figure 2 represents it at the time at which the film disengaging from the small tooth 14 is going to jump elastically forward to assume again the position of Figure 1 displaced forward by one photogram. The time employed by the film to displace from the position of Figure 1 to the position of Figure 2 comprises nearly the whole time of a cycle, while the time employed by the film to pass from the position of Figure 2 to the position of Figure 1 is very short and corresponds to a small fraction of the cycle.

Having now particularly described and ascertained the nature of my said invention and in what manner the said is to be performed, I declare that what I claim is:

1. A device for causing intermittent forward motion of the film in cinematographic apparatus comprising a chamber having a film inlet thereto and a film outlet therefrom, a first straight wall portion adjacent the inlet, a second straight wall portion connected to said first wall portion at an angle thereto and defining a support for one face of the film and containing an aperture for the passage of light, a third curved wall portion extending from said second wall portion around a semicircular arc, a tooth in said curved wall portion projecting therefrom into said chamber in a direction substantially parallel to said second wall portion and of a size to penetrate into the perforations of the film, said film outlet being positioned at the end of said third wall portion remote from said second wall portion, means for driving the film through said chamber comprising a first sprocket for feeding the film with uniform speed into the chamber through said inlet in a direction away from said first wall portion and a second sprocket for extracting the film with the same uniform speed from the chamber through said outlet in a direction along a tangent of said sprocket substantially parallel to said second wall portion and away from said tooth, and a pin adjacent said first sprocket between which and said first wall portion the film is fed by said first sprocket.

2. A device according to claim 1 further characterized in that said tooth is pointed and curved in a direction opposed to the film movement.

References Cited in the file of this patent

UNITED STATES PATENTS

| Number | Name | Date |
|---|---|---|
| 1,244,920 | Thomas | Oct. 30, 1917 |
| 1,874,908 | Craig et al. | Aug. 30, 1932 |
| 1,898,850 | Papo et al. | Feb. 21, 1933 |
| 2,423,562 | Lee | July 8, 1947 |
| 2,431,254 | Jacobson | Nov. 18, 1947 |

FOREIGN PATENTS

| Number | Country | Date |
|---|---|---|
| 426,239 | Great Britain | Mar. 29, 1935 |
| 979,656 | France | Dec. 13, 1950 |